(12) United States Patent
Sugisawa et al.

(10) Patent No.: US 8,265,339 B2
(45) Date of Patent: Sep. 11, 2012

(54) IMAGE PROCESSING DEVICE, IMAGE PROCESSING METHOD, AND INTEGRATED CIRCUIT FOR PROCESSING IMAGES

(75) Inventors: Yuji Sugisawa, Fukuoka (JP); Hiroto Tomita, Fukuoka (JP)

(73) Assignee: Panasonic Corporation, Osaka (JP)

( * ) Notice: Subject to any disclaimer, the term of this patent is extended or adjusted under 35 U.S.C. 154(b) by 492 days.

(21) Appl. No.: 12/664,735

(22) PCT Filed: Apr. 22, 2009

(86) PCT No.: PCT/JP2009/001847
§ 371 (c)(1),
(2), (4) Date: Feb. 15, 2009

(87) PCT Pub. No.: WO2009/130899
PCT Pub. Date: Oct. 29, 2009

(65) Prior Publication Data
US 2010/0183193 A1   Jul. 22, 2010

(30) Foreign Application Priority Data
Apr. 25, 2008   (JP) ................................. 2008-115050

(51) Int. Cl.
*G06K 9/68* (2006.01)
(52) U.S. Cl. ....................................... 382/103; 382/218
(58) Field of Classification Search .................. 382/103, 382/118, 217, 218, 298
See application file for complete search history.

(56) References Cited

U.S. PATENT DOCUMENTS

| | | | |
|---|---|---|---|
| 6,532,301 B1 | 3/2003 | Krumm et al. | 382/170 |
| 2003/0235327 A1 | 12/2003 | Srinivasa | 382/104 |
| 2004/0170318 A1 | 9/2004 | Crandall et al. | 382/165 |
| 2005/0069208 A1* | 3/2005 | Morisada | 382/190 |
| 2005/0123201 A1 | 6/2005 | Nakashima et al. | 382/195 |
| 2005/0152580 A1 | 7/2005 | Furukawa et al. | 382/103 |
| 2005/0152603 A1 | 7/2005 | Bober | 382/190 |
| 2006/0029276 A1 | 2/2006 | Nagahashi et al. | 382/173 |
| 2007/0047760 A1 | 3/2007 | Sharma et al. | 382/100 |
| 2007/0110321 A1 | 5/2007 | Okada et al. | 382/209 |
| 2008/0002878 A1 | 1/2008 | Meiyappan | 382/154 |

FOREIGN PATENT DOCUMENTS

| | | |
|---|---|---|
| CN | 1614622 A | 5/2005 |
| JP | 6-325162 A | 11/1994 |
| JP | 2003-133601 A | 5/2003 |

(Continued)

OTHER PUBLICATIONS

International Search Report issued Aug. 11, 2009 in International (PCT) Application No. PCT/JP2009/001847.

(Continued)

*Primary Examiner* — Andrew W Johns
(74) *Attorney, Agent, or Firm* — Wenderoth, Lind & Ponack, L.L.P.

(57) ABSTRACT

This image processing apparatus, for photographed images taken at a predetermined time interval and input sequentially, specifies an image area as the target of predetermined processing. The apparatus (i) has processing capability to generate, in accordance with a particular input photographed image, reduced images at K (K≧1) ratios within the predetermined time interval, (ii) selects, for each photographed image that is input, M (M≦K) or fewer ratios from among L (L>K) different ratios in accordance with ratios indicated for a photographed image input prior to the photographed image, (iii) compares each of the reduced images generated at the selected M or fewer ratios with template images, and (iv) in accordance with the comparison results, specifies the image area.

13 Claims, 10 Drawing Sheets

FOREIGN PATENT DOCUMENTS

| | | | |
|---|---|---|---|
| JP | 2004-30629 | A | 1/2004 |
| JP | 2005-173787 | A | 6/2005 |
| JP | 2006-202184 | A | 8/2006 |
| JP | 2006-323779 | A | 11/2006 |
| JP | 2007-135115 | A | 5/2007 |
| WO | 2008/129875 | A1 | 10/2008 |

OTHER PUBLICATIONS

Office Action issued May 25, 2011 in corresponding Chinese Application No. 200880000536.6.
Office Action dated Mar. 9, 2012 in corresponding U.S. Appl. No. 12/377,191, filed Jun. 1, 2010.
Verified English Translation of WO 2008/129875.

\* cited by examiner

FIG. 3

| Reduction ID | Reduction ratio | Horizontal size | Vertical size |
|---|---|---|---|
| 0 | $(1/1.22)^0$ | 320 pixels | 240 pixels |
| 1 | $(1/1.22)^1$ | 262 pixels | 196 pixels |
| 2 | $(1/1.22)^2$ | 214 pixels | 160 pixels |
| 3 | $(1/1.22)^3$ | 175 pixels | 131 pixels |
| 4 | $(1/1.22)^4$ | 143 pixels | 107 pixels |
| 5 | $(1/1.22)^5$ | 117 pixels | 87 pixels |
| 6 | $(1/1.22)^6$ | 95 pixels | 71 pixels |
| 7 | $(1/1.22)^7$ | 77 pixels | 58 pixels |
| 8 | $(1/1.22)^8$ | 63 pixels | 47 pixels |
| 9 | $(1/1.22)^9$ | 51 pixels | 38 pixels |
| 10 | $(1/1.22)^{10}$ | 41 pixels | 31 pixels |
| 11 | $(1/1.22)^{11}$ | 33 pixels | 25 pixels |

IMAGE PROCESSING DEVICE, IMAGE PROCESSING METHOD, AND INTEGRATED CIRCUIT FOR PROCESSING IMAGES

TECHNICAL FIELD

The present invention relates to image processing technology, and in particular to technology for specifying in a photographed image an image area matching predetermined criteria.

BACKGROUND ART

Established technology exists for performing predetermined processing to specify an area in a photographed image (frame image) taken at predetermined intervals (e.g. every 33 ms) by digital cameras or the like, the area including a specified image (e.g. a facial image) smaller than the size of the photographed image, and to display a frame on the specified area, to focus on the specified area, etc.

One method for specifying an area including a specified image is to detect the specified image by comparing a template image (an image of a predetermined size, smaller than the photographed image) for detecting the specified image with a plurality of reduced images based on the photographed image, which are generated by changing the reduction ratio incrementally. In other words, a specified image is detected by performing comparative processing for each reduced image while shifting the template image from the upper left pixel of the rectangular reduced image to the lower right pixel. Based on the results of this processing, the area containing the specified image is identified.

The reduction ratios are preset so as to make it possible to detect specified images of varying sizes included in a photographed image by comparing the generated plurality of reduced images with the template image.

Such processing to generate reduced images, however, generally requires a relatively long period of time, and as the number of reduced images generated from one photographed image grows larger, it may become impossible to detect a specified image within the time interval between photographs (in this example, 33 ms).

In particular, when a moving subject is being photographed, and for example photographs are displayed at the same rate as the photography frame rate, then if for a certain photographed image, a specified image is detected after the time interval between photographs has elapsed, the specified image area and the actual area in the subject may become out of alignment to a relatively large degree. For example, if predetermined processing is performed to display a frame around the specified image area, the location of the frame may end up differing from the location in the actual subject.

To solve this problem, there is a known method of improving the probability of detecting a specified image within the time interval between photographs by changing the order in which reduced images are generated in accordance with the photography mode of the digital camera (for example, Patent Document 1).

In the imaging apparatus in Patent Document 1, it is possible to generate reduced images G1-G7 that are incrementally reduced from the original image G0 (in this example, the size decreases sequentially from G1 to G7). On the other hand, if the camera is in a mode for photographing people or other such mode in which close-range photography of a small number of people can be expected, then since the size of the facial images in the photographed image tends to be larger in these modes, the reduced images can be generated in the order from G7 to G0 and compared with the template image. Furthermore, if the camera is in a mode for photographing scenery or other such mode in which long-range photography can be expected, then since the size of the facial images in the photographed image tends to be smaller in these modes, the reduced images can be generated in the order from G0 to G7 and compared with the template image.

As a result, even if comparison of all of the reduced images with the template is not complete within the time interval between photographs and processing must proceed to the next photographed image, it is possible to improve the probability of detecting a specified image within the time interval between photographs.

CITATION LIST

Patent Literature

[Patent Literature 1]
Japanese Patent Application Publication No. 2007-135115

SUMMARY OF INVENTION

Technical Problem

In recent years, however, users' needs for photography at a high frame rate have grown. When responding to these needs, however, the above-described problem becomes even more prevalent. That is, when a specified image is detected after the time interval between photographs has elapsed, the specified image area and the actual area in the subject can more easily wind up out of alignment to a relatively large degree.

One way of solving this problem is through high-speed processing using high specification hardware that can generate each reduced image in a shorter period of time. This approach, however, requires a relatively large change in design, making an approach that uses current hardware resources preferable.

In light of the above-described problems, therefore, it is an object of the present invention to provide an image processing apparatus that can detect a specified image within the time interval between photographs via a non-conventional method while using current hardware resources.

Solution to Problem

The above-described object is fulfilled by an image processing apparatus for specifying, in photographed images taken at a predetermined time interval and input sequentially, an image area as a target of predetermined processing, the image processing apparatus comprising: a reduced image generation unit that (i) has processing capability to generate reduced images, in accordance with a particular input photographed image, at K (K≧1) ratios within the predetermined time interval and (ii) is operable to generate reduced images at ratios indicated from among L (L>K) different ratios; a comparison unit operable to compare each reduced image generated by the reduced image generation unit with template images and to transmit comparison results; a specification unit operable to perform specification of the image area in accordance with the comparison results transmitted by the comparison unit; and a control unit that, for each photographed image that is input, is operable to (i) select M (M≦K) or fewer ratios for each photographed image in accordance with ratios indicated for a photographed image input prior to each photographed image, (ii) indicate the selected M or fewer ratios to the reduced image generation unit and make the reduced image generation unit generate each reduced image, (iii) make the comparison unit compare each generated reduced image, and (iv) make the specification unit specify the image area for each photographed image in accordance with, at least, comparison results transmitted by the comparison unit.

Advantageous Effects of Invention

With the above-described structure, the image processing apparatus generates reduced images for each photographed image at M or fewer ratios from among L ratios, in accordance with the processing capability of the apparatus (the capability to generate reduced images at K ratios within the predetermined time interval) and compares each reduced image with template images, thereby increasing the probability of detecting an image corresponding to a template within the predetermined time.

The control unit may alternately indicate to the reduced image generation unit, as the M or fewer ratios for each photographed image that is input, (i) M or fewer ratios that include N (N≦M) ratios selected from among odd numbered ratios and (ii) M or fewer ratios that include N (N≦M) ratios selected from among even numbered ratios, the even and odd numbered ratios corresponding to the L ratios arranged in ascending or descending order.

With the above-described structure, the image processing apparatus alternately uses, for comparison with template images, reduced images generated at even numbered ratios and reduced images generated at odd numbered ratios, the even and odd numbered ratios corresponding to the L ratios arranged in ascending or descending order. As compared to when M or fewer ratios are selected arbitrarily from among L ratios, this increases the probability of detecting, in each photographed image, images of various sizes corresponding to template images.

The control unit may (i) select one or more ratios from among M or fewer ratios indicated for a photographed image input prior to a particular photographed image, in accordance with comparison results transmitted from the comparison unit for the photographed image input prior to the particular photographed image, the comparison results indicating that an image corresponding to a template image was detected, and (ii) include the selected ratios in the M or fewer ratios for the particular photographed image which are indicated to the reduced image generation unit.

With the above-described structure, the image processing apparatus selects, from among the ratios used for generating the reduced images for a photographed image input prior to a current photographed image, ratios for images detected as corresponding to a template image, and thus the apparatus generates reduced images for the current photographed image using ratios from a prior detection. Therefore, when the current photographed image resembles the photographed image input prior to the current photographed image, the probability of detecting, in the current photographed image, an image corresponding to a template image is increased even further.

Examples of when the current photographed image would resemble the photographed image input prior to the current photographed image include when the predetermined time interval is sufficiently short (e.g. 33 ms) or when photographed subjects are still.

The control unit may (i) select one or more ratios from among M or fewer ratios indicated for a photographed image input prior to a particular photographed image, in accordance with comparison results transmitted from the comparison unit for the photographed image input prior to the particular photographed image, the comparison results indicating that an image corresponding to a template image was detected, and (ii) include, in the N ratios for the particular photographed image, ratios that are immediately before or after the selected ratios in the ascending or descending order of the L ratios.

With the above-described structure, the image processing apparatus selects, from among the ratios used for generating the reduced images for a photographed image input prior to a current photographed image, ratios for images detected as corresponding to a template image, and the apparatus then generates reduced images for the current photographed image using ratios in the vicinity of the selected ratios. Therefore, when the current photographed image resembles the prior input photographed image, the probability of detecting, in the current photographed image, an image corresponding to a template image is increased even further.

This is because, when the current photographed image resembles the photographed image input prior to the current photographed image, there is a high probability of detecting, in the current photographed image, an image corresponding to a template image when using ratios in the vicinity of the ratios for which images were detected in the photographed image input prior to the current photographed image.

The comparison unit may transmit, as the comparison results, pieces of area information each indicating an image area that is detected through comparison of each reduced image with template images, the image area corresponding to one of the template images, and the specification unit may perform the specification in accordance with (i) the pieces of area information for a particular photographed image and (ii) the pieces of area information for a photographed image input prior to the particular photographed image, the pieces of area information in (i) and (ii) being transmitted by the comparison unit.

With the above-described structure, the image processing apparatus specifies the image area for a current photographed image in accordance with not only the pieces of area information for the current photographed image but also the pieces of area information for a photographed image input prior to the current photographed image; the pieces of area information each indicating an image area that is detected through comparison of each reduced image with template images, the reduced images being generated at M or fewer ratios from among L predetermined ratios. Therefore, the apparatus is able to suppress the effects of error and increase the probability of specifying the image area.

The specification unit may specify one image area, in accordance with pieces of area information that indicate image areas that are positioned within a predetermined proximity to each other, from among (i) the pieces of area information for the particular photographed image and (ii) the pieces of area information for the photographed image input prior to the particular photographed image, the pieces of area information in (i) and (ii) being transmitted by the comparison unit.

With the above-described structure, the image processing apparatus specifies the image area for a current photographed image in accordance with the pieces of information for the current photographed image and for the photographed image input prior to the current photographed image that indicate image areas that are positioned in proximity to each other, thereby suppressing the effects of error and increasing the probability of specifying the image area.

The control unit may determine the M or fewer ratios for a particular photographed image to indicate to the reduced image generation unit in accordance with comparison results, transmitted by the comparison unit, for a photographed image input prior to the particular photographed image.

With the above-described structure, if the image processing apparatus selects, for example, from among the ratios used for generating the reduced images for a photographed image input prior to a current photographed image, ratios for images detected as corresponding to a template image, then the apparatus generates reduced images for the current photographed image using ratios from a prior detection. Therefore, when the current photographed image resembles the photographed image input prior to the current photographed image, the probability of detecting, in the current photographed image, an image corresponding to a template image is increased even further.

In the image processing apparatus, a plurality of candidate template images may be stored as candidates for the template images, and the comparison unit may select the template images to use for comparison of a particular photographed image from among the candidate template images, in accordance with comparison results for a photographed image input prior to the particular photographed image.

With the above-described structure, for example, if the image processing apparatus detects, in a photographed image input prior to the current photographed image, an image corresponding to a template image, then by using that template image for comparison in the current photographed image, it is possible to increase the probability of detecting, in a shorter amount of time, an image corresponding to a template image in the current photographed image when the current photographed image resembles the photographed image input prior to the current photographed image.

The comparison unit may transmit, as the comparison results, pieces of area information each indicating an image area that is detected through comparison of each reduced image with template images, the image area corresponding to one of the template images, and the specification unit may perform the specification in accordance with (i) the pieces of area information for a particular photographed image and (ii) the pieces of area information for a photographed image input prior to the particular photographed image, the pieces of area information in (i) and (ii) being transmitted by the comparison unit.

With the above-described structure, the image processing apparatus specifies the image area for a current photographed image in accordance with not only the pieces of area information for the current photographed image but also the pieces of area information for a photographed image input prior to the current photographed image, the pieces of area information each indicating an image area that is detected through comparison of each reduced image with template images, the reduced images being generated at M or fewer ratios from among L predetermined ratios. Therefore, the apparatus is able to suppress the effects of error and increase the probability of specifying the image area.

The specification unit may specify one image area, in accordance with pieces of area information that indicate image areas that are positioned within a predetermined proximity to each other, from among (i) the pieces of area information for the particular photographed image and (ii) the pieces of area information for the photographed image input prior to the particular photographed image, the pieces of area information in (i) and (ii) being transmitted by the comparison unit.

With the above-described structure, the image processing apparatus specifies the image area for a current photographed image in accordance with the pieces of information for the current photographed image and for the photographed image input prior to the current photographed image that indicate image areas that are positioned in proximity to each other, thereby suppressing the effects of error and increasing the probability of specifying the image area.

The image processing apparatus may further comprise a display unit that, for each photographed image that is input, is operable to display both (i) the photographed image and (ii) a frame indicating an image area at a position on the photographed image corresponding to the image area as specified for the photographed image by the specification unit.

With the above-described structure, the image processing apparatus displays a frame at the position of the image area specified for the input photographed image, allowing the user to easily recognize the image area that is the target of predetermined processing.

BRIEF DESCRIPTION OF DRAWINGS

FIG. 3 shows an example of correlations between reduction IDs and reduction ratios.

DESCRIPTION OF EMBODIMENTS

Figure 1:
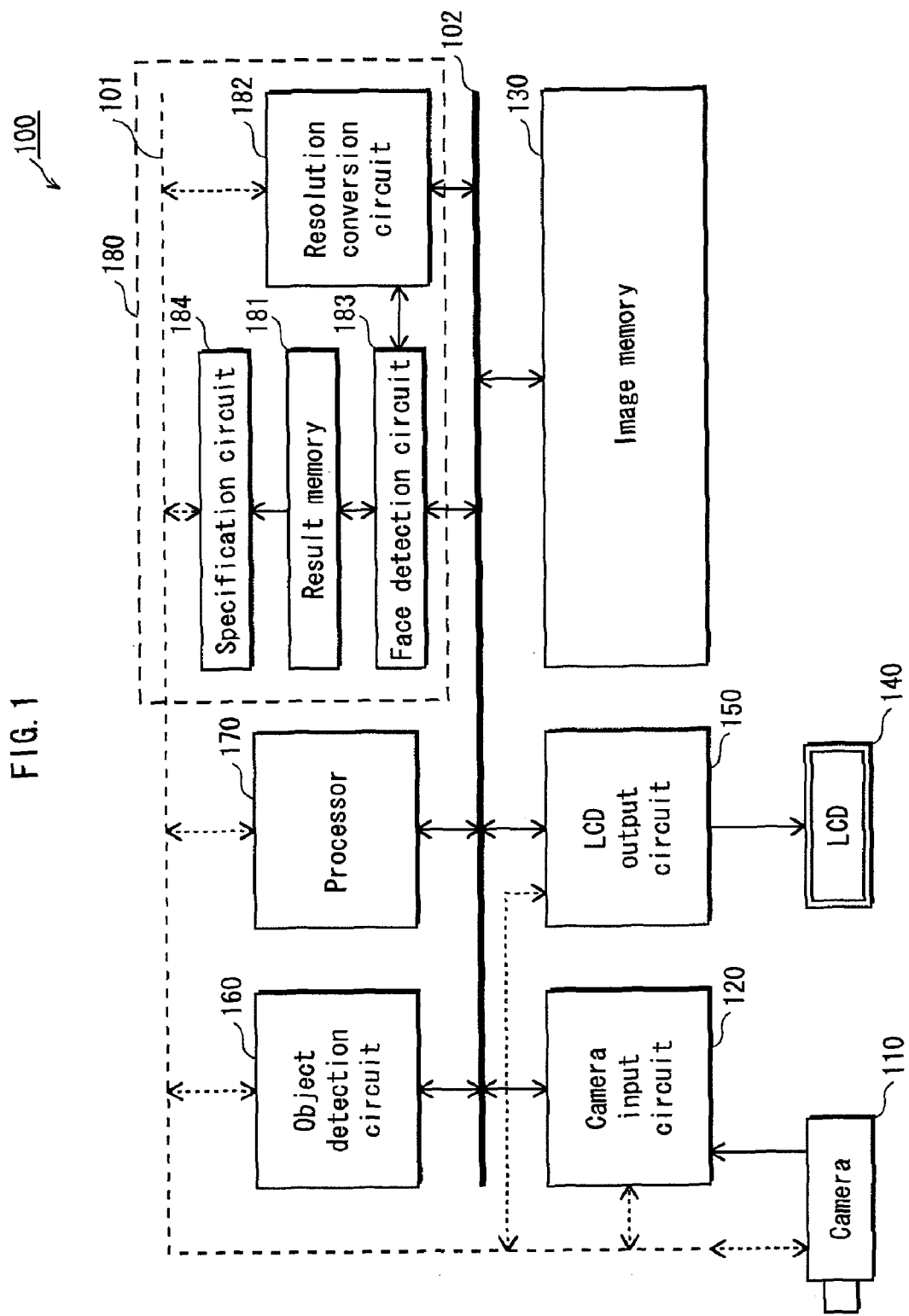
FIG. 1 is a functional block diagram of an image processing apparatus 100.

The following is an explanation of an embodiment of the image processing apparatus in the present invention.

Embodiment 1

<Overview>

The image processing apparatus in the present embodiment specifies an image area that includes a facial image (hereinafter "facial image area") in each photographed image generated by taking photographs at a predetermined interval (e.g. every 33 ms).

The photographed images are 4VGA size (1280×960 pixels), a relatively large size, and thus the image processing apparatus performs detection processing of facial images by focusing on one region within the image (hereinafter, "detection target image"). The detection target image is an image with an area in which some sort of object was detected by a conventional edge detection method or the like.

This image processing apparatus detects a facial image by performing processing on the detection target image repeatedly at a predetermined size. In other words, the image processing apparatus generates successively reduced images from this image of a predetermined size (hereinafter "comparison target image") and compares each of the generated reduced images with a template image of a facial image to detect a facial image.

It is possible to use 12 different reduction ratios whose amount of reduction is set to be successively larger as the reduction ratios for generating each reduced image. In this image processing apparatus, however, for each photographed image, rather than using all 12 reduction ratios, six of these reduction ratios are used to generate reduced images.

In the present embodiment, the image processing apparatus is assumed to have the processing capability for generating reduced images at six reduction rates within a predetermined amount of time.

This image processing apparatus specifies the facial image area by using the results of comparison with the template image for two photographed images photographed consecutively.

In this way, as the image processing apparatus generates reduced images at six of the reduction rates among the 12 reduction rates, the processing load for generating and comparing the reduced images for each photographed image can be reduced, and furthermore as the apparatus specifies the facial image area by using the comparison results for two photographed images consecutively photographed, the facial image area can be specified without a great loss in precision as compared to processing that generates and compares 12 different reduced images.

<Structure>

First, the following is a description of the structure of the image processing apparatus 100.

FIG. 1 is a functional block diagram of the image processing apparatus 100.

As shown in FIG. 1, the image processing apparatus 100 comprises a camera 110, a camera input circuit 120, an image memory 130, an LCD (Liquid Crystal Display) 140, an LCD output circuit 150, an object detection circuit 160, a processor 170, and a face detection apparatus 180.

Data transfer between the processor 170 and the other constituent elements is performed via a processor bus 101. Also, access to the image memory 130 from the other constituent elements besides the camera 110 is performed via a memory bus 102.

The camera 110 captures images at a predetermined frame rate (e.g. 30 fps (frames per second)) and transmits a sequentially generated 4VGA size photographed image (data) to the camera input circuit 120.

The camera input circuit 120 performs, on the photographed image received from the camera 110, various types of filter processing for improving image quality and stores the filtered photographed image in the image memory 130. The camera input circuit 120 notifies the processor 170 once it has stored the filtered photographed image in the image memory 130.

The image memory 130 is a memory area for storing a filtered photographed image.

The LCD 140 includes a liquid crystal display (LCD) and displays images in accordance with instructions from the LCD output circuit 150.

At the same frame rate as the frame rate for photography, the LCD output circuit 150 reads the photographed image stored in the image memory 130 and causes the LCD 140 to display the image, while also, in accordance with instructions from the processor 170, causing the LCD 140 to display a rectangular frame indicating the specified facial image area.

In accordance with instructions from the processor 170, the object detection circuit 160 reads the photographed image recorded in the image memory 130, performs object detection processing, and transmits the detection results, which include information indicating whether an object was detected, to the processor 170.

This object detection is performed, for example, by comparing edge detection results for (i) a photographed image in which no object is shown and (ii) the photographed image recorded in the image memory 130. In particular, when an object is detected, detection results that include the coordinate values (for example, the coordinate values of the upper left and lower right edges) of the rectangular detection target image, which includes the detected object, are transmitted to the processor 170.

By executing a control program stored in internal memory (not shown), the processor 170 controls the image processing apparatus 100 as a whole and provides instructions and notifications to each block in the apparatus.

In particular, when the processor 170 receives detection results from the object detection circuit 160 that include information indicating that an object was detected, it notifies the face detection apparatus 180 of the coordinate values for the detection target image (included in the detection results) and of the reduction ratios for generating the reduced images. When the processor 170 receives detection results from the object detection circuit 160 that include information indicating that an object was not detected, it notifies the face detection apparatus 180 that no object was detected.

The processor 170 also causes the LCD output circuit 150 to display a rectangular frame indicating the specified facial image area in accordance with the coordinate values or the like indicating the specified facial image area.

The face detection apparatus 180 processes the detection target image indicated by the coordinate values of which it was notified by the processor 170 in units of a predetermined size (QVGA size (320×240 pixels)) and specifies a facial image area. More concretely, the face detection apparatus 180 detects a facial image by comparing reduced images, which are a reduction of this image of a predetermined size (the comparison target image), with each template image, and based on the comparison results, it specifies a facial image area.

The face in each template image faces a different direction, and by using each template image for comparison, facial images that face a variety of directions in the reduced image can be detected.

The face detection apparatus 180 comprises a result memory 181, a resolution conversion circuit 182, a face detection circuit 183, and a specification circuit 184.

The result memory 181 is a memory area for storing (i) a list (hereinafter "result list") of each of the comparison results for the photographed image being processed by the face detection apparatus 180 and (ii) the result list for the photographed image taken one image prior to the current photographed image.

The resolution conversion circuit 182 determines, inside the detection target image indicated by the coordinate values of which it was notified by the processor 170, the comparison target images (QVGA size) from which reduced images are to be generated. The resolution conversion circuit 182 then generates reduced images of the determined comparison target images, using the reduction ratios of which the processor 170 provided notification, and transmits the reduced images to the face detection circuit 183.

The comparison target images can be determined using a similar method to the method disclosed in PCT/JP2008/000961, which establishes overlap areas from the upper left to the lower right of the detection target image. Therefore, details are omitted here.

In the present embodiment, the reduction ratio is the ratio of the size of the comparison target image (QVGA size), set as 1, to the size of the image after reduction. Therefore, when the reduction ratio is large (for example, 0.82), the amount of reduction is small, and conversely when the reduction ratio is small (for example, 0.11), the amount of reduction is large.

In the present embodiment, even when the reduction ratio is 1.0, i.e. when the reduced image is identical to the comparison target image, the term "reduced image" is still used.

By comparing the reduced image input from the resolution conversion circuit 182 with each template image (each of a predetermined size of 24×24 pixels), the face detection circuit 183 detects a facial image included in the reduced image.

More concretely, for each template image, the face detection circuit 183 performs processing that compares the reduced image with the template image while shifting the template image from the upper left pixel to the lower right pixel in the received reduced image, storing each of the comparison results in the result memory 181 as the result list for the photographed image being processed by the face detection apparatus 180.

In addition to information indicating whether a facial image was detected or not, in particular when an object was detected, the comparison results include (i) coordinate values which are the result of transformation into coordinates on the photographed image of the coordinate values in the reduced image indicating the upper left edge of the detected rectangular facial image, (ii) information indicating the reduction ratio (hereinafter, "reduction ID") for the reduced image that includes the detected facial image, and (iii) information indicating the direction faced by the face in the template (hereinafter, "template ID") used for detection.

In the example below, the face detection circuit 183 uses three template images for comparison: a face that faces forward, a face turned to the right, and a face turned to the left. The template IDs for the template images are, respectively, "0," "1," and "2."

Since the reduced image and the photographed image are similar, the above-mentioned transformation from the coordinate values in the reduced image to coordinate values in the photographed image can be performed by simple comparative calculation using the ratio of the horizontal sizes and vertical sizes of both images, and thus a detailed explanation is omitted.

The specification circuit 184 specifies a facial image area based on the comparison results included in the result lists, stored in the result memory 181, for the photographed image currently being processed by the face detection apparatus 180 and for the photographed image taken one image prior. The specification circuit 184 then transmits coordinate values and other information indicating the determined facial image area to the processor 170. Details regarding the method for specification of the facial image area are provided below.

<Face Detection>

Next, the following is a description of the face detection method used by the face detection apparatus 180.

Figure 2:
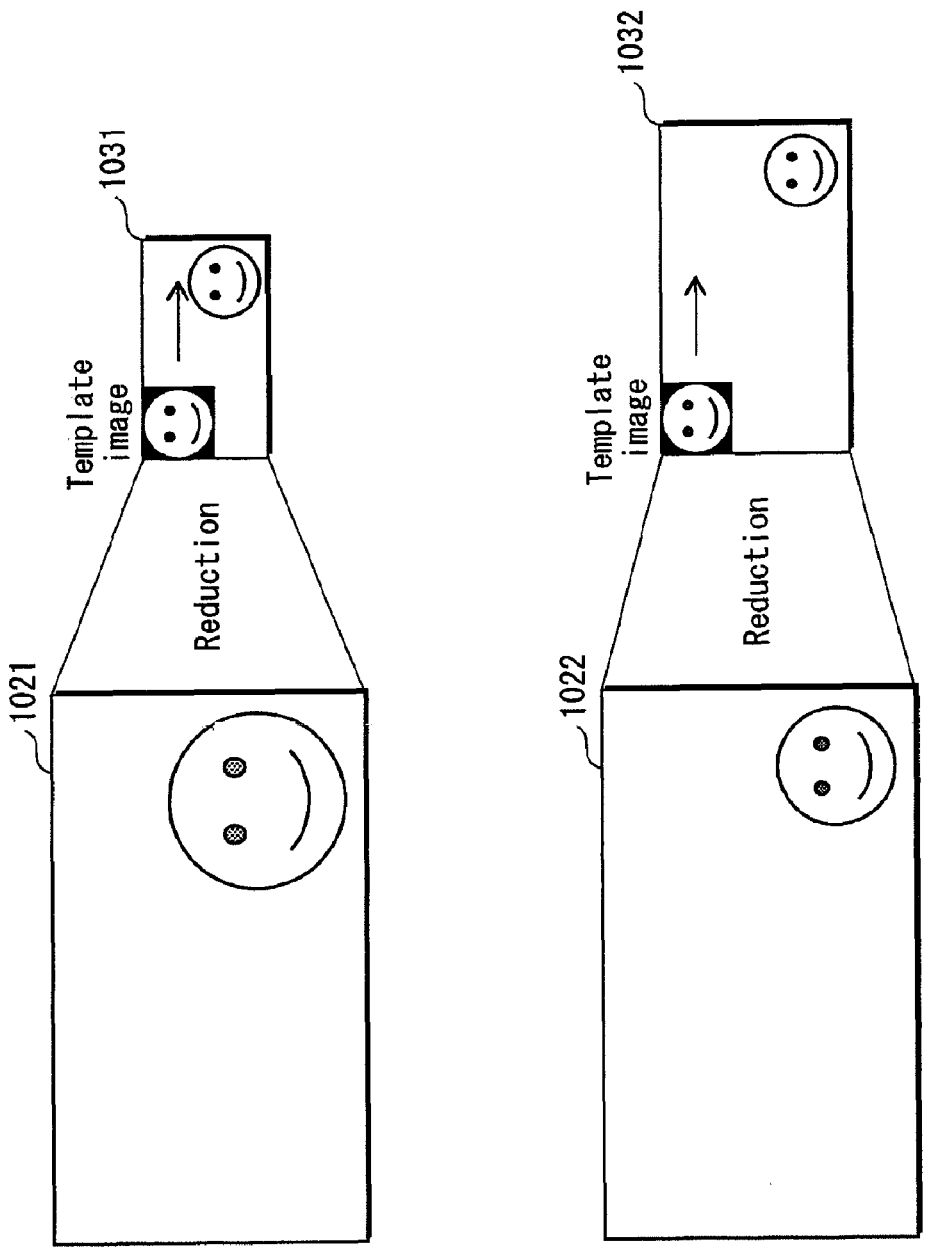
FIG. 2 illustrates a face detection method used by a face detection apparatus 180.

FIG. 2 illustrates the face detection method used by the face detection apparatus 180.

In this figure, a comparison target image 1021 and a comparison target image 1022 each include a facial image, and the facial image included in the comparison target image 1021 is larger than the facial image included in the comparison target image 1022.

In order to compare the comparison target image 1021 with a template image of a predetermined size (for example 24×24 pixels) and detect a facial image, the size of the facial image included in the comparison target image 1021 must be reduced to the same extent as the size of the facial image in the template image. A reduced image 1031 refers to the image that has been reduced in this way.

The face detection circuit 183 detects a facial image by repeatedly comparing the template image with the reduced image while shifting the template image over the reduced image 1031 from the top left pixel to the bottom right pixel.

Detection is performed similarly when detecting a facial image in the comparison target image 1022: the face detection circuit 183 repeatedly compares a reduced image 1032 that is a reduction of the comparison target image 1022 to the template image.

In this example, the size of the reduced image 1032 is larger than the size of the reduced image 1031. This indicates that the reduced image 1032 has been reduced to a lesser extent than the reduced image 1031. Since the size of the facial image included in the comparison target image 1022 is smaller than the size of the facial image included in the comparison target image 1021, the size of the facial image included in the target image 1022 can thus be reduced to the same degree of size as the facial image in the template image at a lower degree of reduction.

To detect the facial image in the comparison target image in this way, it is necessary to compare the template image with a reduced image that has been reduced at a reduction ratio in accordance with the size of the facial image included in the comparison target image. However, since the size of the facial image included in the comparison target image is not known when actually attempting to detect the facial image, the face detection circuit 183 detects the facial image by repeatedly comparing the template image to the reduced image while gradually changing the reduction ratio of the reduced image.

As shown in FIG. 3, for example, each reduction ratio for the reduced image can be determined by incrementally changing the reduction ratio used previously by a factor of 1/1.22.

FIG. 3 shows an example of correlations between reduction IDs and reduction ratios.

In this figure, the notation $(1/1.22)\char`\^n$ indicates $(1/1.22)$ raised to the $n^{th}$ power.

In this figure, for example, the reduction ratio when the reduction ID is "0" is $(1/1.22)\char`\^0$, that is, 1.0, and when the comparison target image is reduced by the corresponding reduction ratio, the resulting reduced image has a horizontal size of 320 pixels and a vertical size of 240 pixels.

When, on the other hand, the reduction ID is "11," the reduction ratio is $(1/1.22)\char`\^{11}$, the horizontal size of the reduced image is 33 pixels, and the vertical size is 25 pixels.

Note that since matching cannot be performed when the size of the reduced image is smaller than the size of the template image (in the above example, 24×24 pixels), in this example, the smallest reduction ratio is "11," i.e. this reduction ratio indicates the greatest degree of reduction.

<Data>

Next, the following is a description of the arrangement of a photographed image in the image memory 130.

Figure 4:
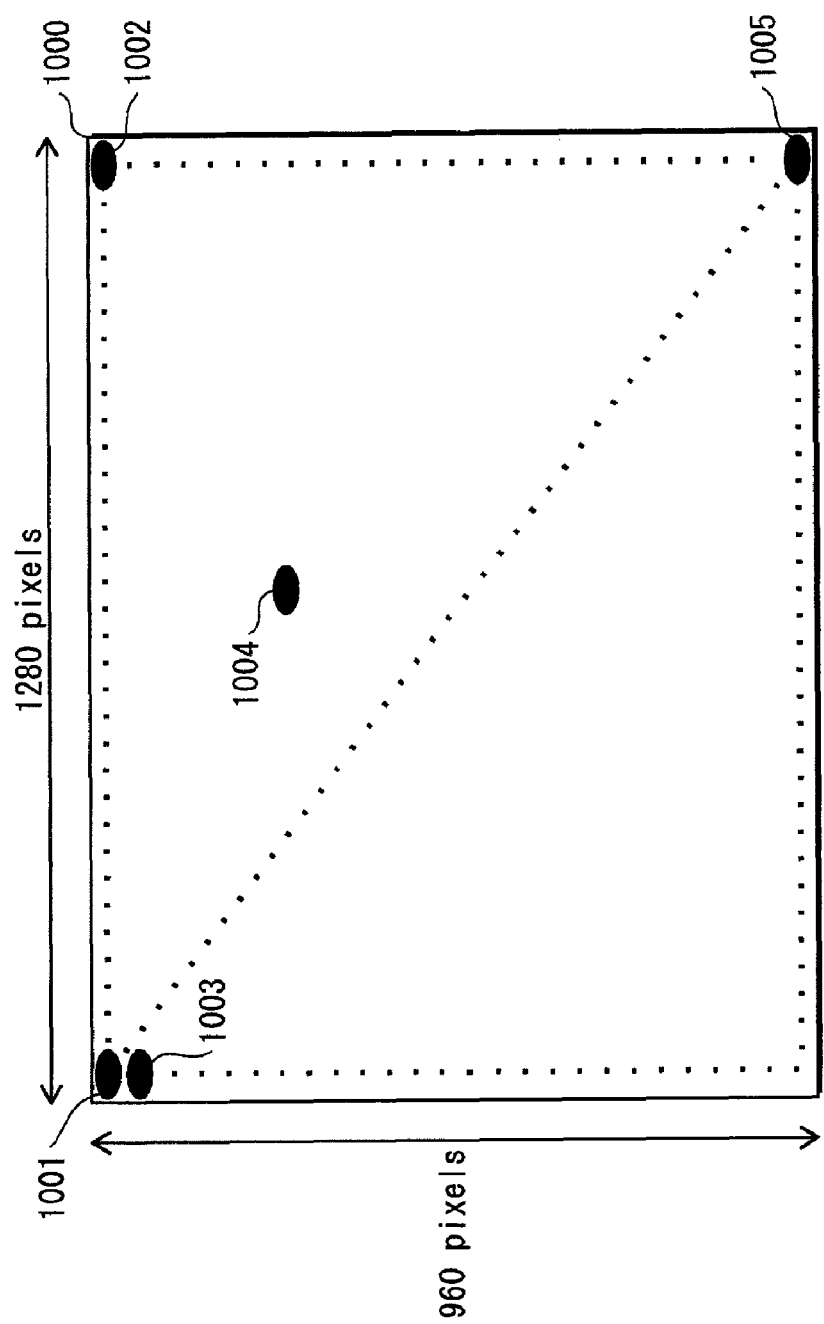
FIG. 4 illustrates the arrangement of a photographed image 1000 in an image memory 130.

FIG. 4 illustrates the arrangement of a photographed image 1000 in an image memory 130.

As described above, the photographed image 1000 is constituted from 4VGA, size (1280×960 pixels) image data, and pixel value data for the pixels constituting the photographed image 1000 are stored sequentially in continuous regions of the image memory 130. For example, the pixels shown in FIG. 4 are stored in continuous regions in the following order: 1001, . . . , 1002, 1003, . . . , 1004, . . . , 1005.

In this example, when an address value of an area in the image memory 130 in which a pixel 1001 is stored is expressed as BASE, address values of areas in which the pixel data values are stored are calculated with use of the following formula. Note that the horizontal size in the formula is the horizontal size of the photographed image 1000, that is 1280 pixels. The coordinate value of the pixel 1001 is defined as (0, 0), with the X axis extending to the right, and the Y axis extending down. Also, one address indicates an area in the image memory 130 where one pixel worth of image data is stored.

$$\text{Address value} = \text{BASE} + \text{horizontal size} \times Y \text{ axis} + X \text{ axis} \qquad \text{Equation 1}$$

For example, the address value of an area in the image memory 130 in which a pixel 1004 with coordinate values (640, 240) is stored is (BASE+1280×240+640).

The resolution conversion circuit 182 in the face detection apparatus 180 can read a determined comparison target image from the image memory 130 by using the address values calculated from the coordinate values of the comparison target image.

<Operation>

Next, the operation of the image processing apparatus 100, which handles the above-described data and has the above-described structure, is described.

Figure 5:
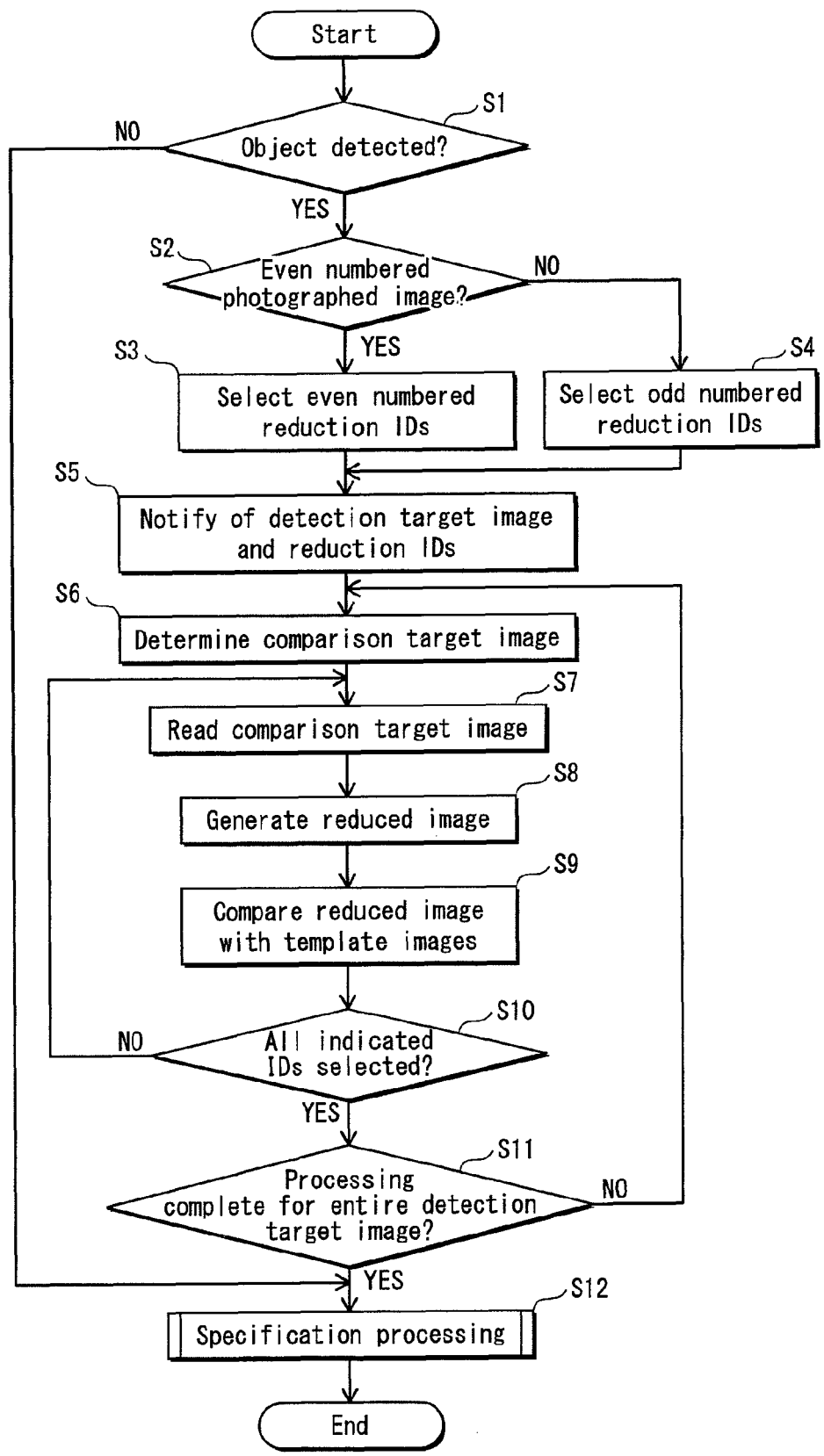
FIG. 5 is a flowchart showing the operations of the image processing apparatus 100.

FIG. 5 is a flowchart showing the operations of the image processing apparatus 100.

Upon receiving notification from the camera input circuit 120 that a photographed image has been stored in the image memory 130, the processor 170 increments the photographed image counter and causes the object detection circuit 160 to begin detection processing. Once it has received the detection results from the object detection circuit 160, the processor 170 determines whether the detection results include information indicating that an object was detected (step S1).

If information indicating that an object was detected is included (step S1: YES), then the processor 170 determines whether the photographed image in which an object was detected is sequentially an even numbered image or not in accordance with the photographed image counter (step S2). For example, if the photographed image counter is 1, then the determination is negative, whereas if the photographed image counter is 2, the determination is positive.

When the photographed image in which an object was detected is sequentially an even numbered image (step S2: YES), then the processor 170 selects the even numbered reduction IDs (0, 2, 4 ... 10) from among the 12 reduction IDs (step S3), and when the photographed image in which an object was detected is sequentially an odd numbered image (step S2: NO), then the processor 170 selects the odd numbered reduction IDs (1, 3, 5 ... 11) (step S4).

The processor 170 notifies the face detection apparatus 180 of the selected reduction IDs and of the coordinate values of the detection target image included in the input detection results (step S5).

The resolution conversion circuit 182 in the face detection apparatus 180 selects one comparison target image in the detection target image indicated by the coordinate values of which the processor 170 provided notification (step S6). In accordance with Equation 1, the resolution conversion circuit 182 then calculates the address value in the image memory 130 in which the selected comparison target image is stored and reads the comparison target image from the image memory 130 (step S7).

The resolution conversion circuit 182 selects one reduction ID from among the reduction IDs of which it was notified in step S5 and generates, at the reduction ratio corresponding to the selected reduction ID, a reduced image for the comparison target image which it has read, sending the reduced image to the face detection circuit 183 (step S8). The resolution conversion circuit 182 may select, for example, the smallest reduction ID from among the reduction IDs which have not yet been selected.

In the first iteration, the face detection circuit 183 generates an empty result list in the result memory 181 for the photographed image being processed by the face detection apparatus 180. Then, the face detection circuit 183 compares the reduced image input from the resolution conversion circuit 182 with each template image while shifting the template image from the upper left pixel to the lower right pixel in the reduced image, recording the comparison results in the result list (step S9).

The resolution conversion circuit 182 determines whether all of the reduction IDs of which it was notified in step S5 have been selected or not (step S10), and when not all reduction IDs have been selected (step S10: NO), the processing from step S7 on is performed again so as to generate reduced images for the reduction IDs that have not yet been selected.

If, on the other hand, all of the reduction IDs have been selected (step S10: YES), then the resolution conversion circuit 182 determines whether processing has been performed for the whole detection target image or not (step S11). When processing has not been performed for the whole detection target image (step S11: NO), then the processing from step S6 on is performed again so as to process the next comparison target image.

If in step 11 processing has been performed for the whole detection target image (step S11: YES), then the specification circuit 184 performs specification processing on the facial image area in accordance with each of the comparison results included in two result lists stored in the result memory 181 (step S12).

If, on the other hand, information indicating that an object was not detected is included in the detection results input from the object detection circuit 160 (step S1: NO), then the processor 170 notifies the face detection apparatus 180 that an object was not detected. The face detection circuit 183 also generates a empty result list in the result memory 181 for the photographed image being processed by the face detection apparatus 180, and the specification circuit 184 performs specification processing on the facial image area in the same way as above (step S12).

Based on the information for the specified facial image area transmitted by the specification circuit 184 as the results of the processing in step S12, the processor 170 notifies the LCD output circuit 150 of the coordinate values (coordinate values of the upper left and lower right edges) of the facial image area to be drawn on top of the photographed image. The LCD output circuit 150 draws a rectangle, indicating the facial image area of which it was notified by the processor 170, on top of the photographed image read from the image memory 130 and causes the LCD 140 to display the photographed image and the rectangle, which ends the processing sequence. If, as a result of the processing in step S12, the processor 170 receives notification from the specification circuit 184 that a facial image area could not be specified, then it is possible not to have the processor 170 notify the LCD output circuit 150 of the above-described coordinates, or to have the processor 170 notify the LCD output circuit 150 of the above-described coordinates based on information for the nearest facial image area specified by the specification circuit 184.

The following is an explanation of the specification processing for the facial image area in step S12.

Figure 6:
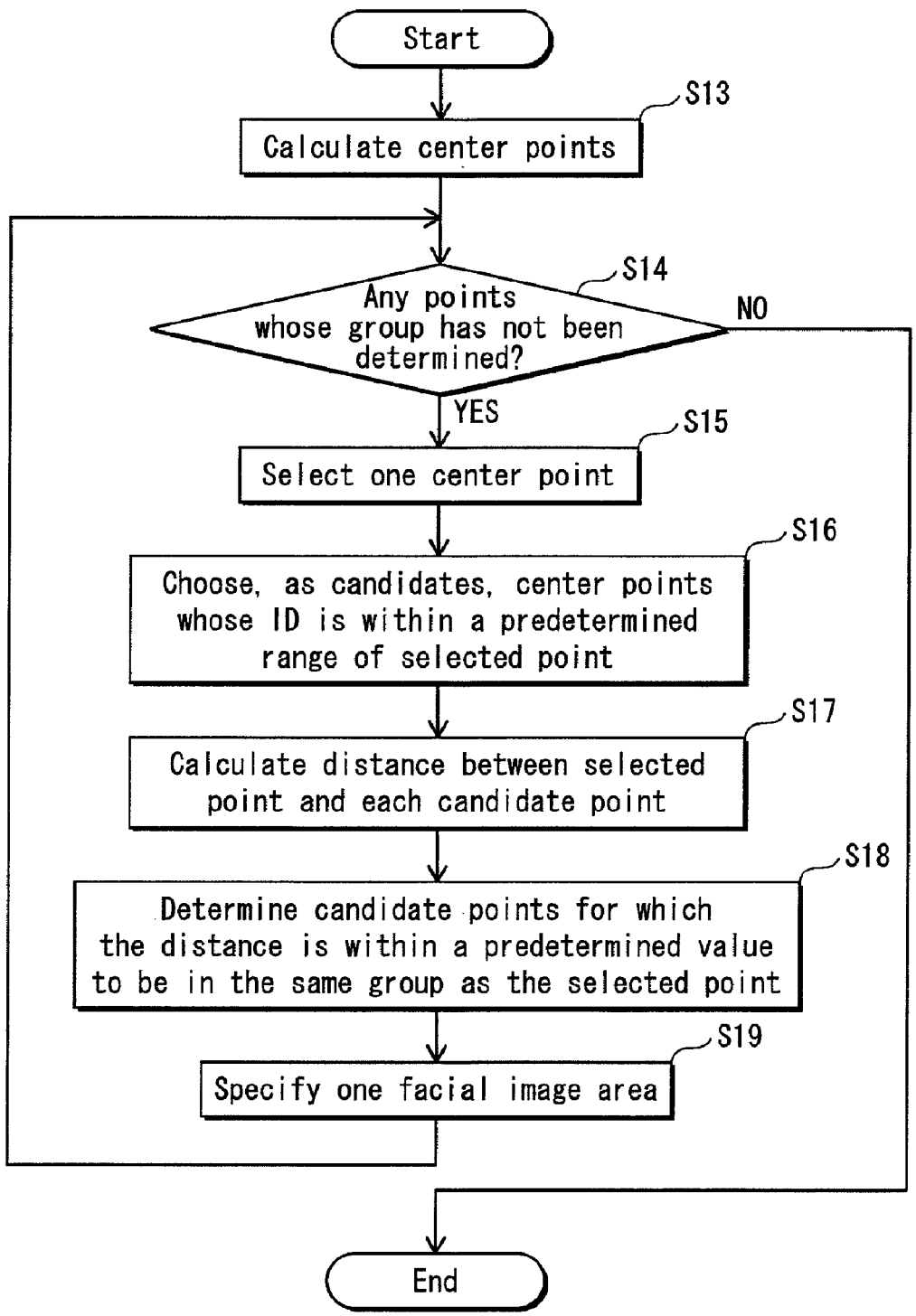
FIG. 6 is a flowchart showing the specification processing of a facial image area by the specification circuit 184.

FIG. 6 is a flowchart showing the specification processing of a facial image area by the specification circuit 184.

For each of the comparison results included in two result lists stored in the result memory 181, the specification circuit 184 calculates the center points for detected facial images based on the coordinate values of the upper left edge of the detected facial image (coordinate values on the photographed image) and on the reduction ID, which are included in the comparison results (step S13).

For example, if the coordinate values for the upper left edge of the detected facial image are (92, 48) and the reduction ID is "2," then based on the size of the template image (24×24 pixels) and on the reduction ratio corresponding to the reduction ID ((1/1.22) ^2), the size of the facial image can be calculated to be 36×36 pixels. Therefore, the center point of the detected facial image can be calculated as (92+36/2, 48+36/2), or (110, 66).

If no object was detected by the object detection circuit 160 (step S1: NO), then as described above, an empty result list is generated that includes no comparison results. Furthermore, when no facial image is detected by the face detection circuit 183, then no coordinate values are included in the comparison results in the result list. Therefore, in some cases the center points may be calculated for comparison results included in only one result list.

Additionally, while not shown in the figures, when coordinate values of the upper left edge of the detected facial image are not included in either result list, the specification circuit 184 notifies the processor 170 that the facial image area could not be specified, and specification processing ends.

The specification circuit 184 determines whether a group has not been determined for any of the calculated center points (step S14). If there is one or more center point whose group has not been determined (step S14: YES), then the specification circuit 184 selects one of the center points whose group has not been determined (step S15). Hereinafter, this center point is referred to as the "selected point." The specification circuit 184 can be made to select, for example, a center point corresponding to coordinate values included in the comparison results that indicate the smallest reduction ID.

The specification circuit 184 chooses, from among the center points whose group has not been determined, center points whose reduction ID is within a predetermined range (e.g. within a range of ±2) of the selected point's reduction ID as candidates for center points belonging to the same group as the selected point's group (step S16). Hereinafter, these centerpoints chosen as candidates are referred to as "candidate points."

For example, if the reduction ID for the selected point is "2" then center points with a reduction ID between "0" and "4" are candidate points.

The specification circuit 184 calculates the distance between the selected point and each candidate point (step S17), and candidate points for which the calculated distance is within a predetermined value (e.g. 20) are determined to be in the same group as the selected point (step S18).

For example, if the coordinate values of a selected point are (110, 66) and the coordinate values of a candidate point are (188, 68), then the distance between the points is "8.2," and the candidate point is determined to belong to the same group as the selected point.

Based on the coordinate values and the size of each facial image for each center point belonging to the same group, the specification circuit 184 specifies a facial image area and transmits the coordinate values of the upper left edge of the facial image area as well as the size of the area to the processor 170 (step S19).

As a concrete example, if the two center points mentioned above, (110, 66) and (118, 68) are determined to be in the same group, then the mean value for the coordinates of these center points is (114, 67).

Furthermore, the size of the facial image with a center point of (110, 66) is 36×36 pixels, as described above. If, for example, the size of the facial image with a center point of (118, 68) is 44×44 pixels, then the mean value for the size of these images is 40×40 pixels.

The specification circuit 184 specifies as a facial image area the image area whose center point is the calculated mean value (114, 67) of the coordinates of the center points and whose size is the calculated mean value (40×40 pixels) of the sizes of the images. The specification circuit 184 then transmits the coordinate values for the upper left edge of the specified facial image area, (114−40/2, 67−40/2), i.e. (94, 47), as well as the size (40×40 pixels) to the processor 170.

When the processing in step S19 is complete, the specification circuit 184 once again performs processing starting with step S14. When there is no center point whose group has not been determined (step S14: NO), then the result list for the photographed image taken one image prior to the photographed image currently being processed by the face detection unit 180 is deleted from the result memory 181, and specification processing for the facial image area is complete.

<Discussion>

Figure 7:
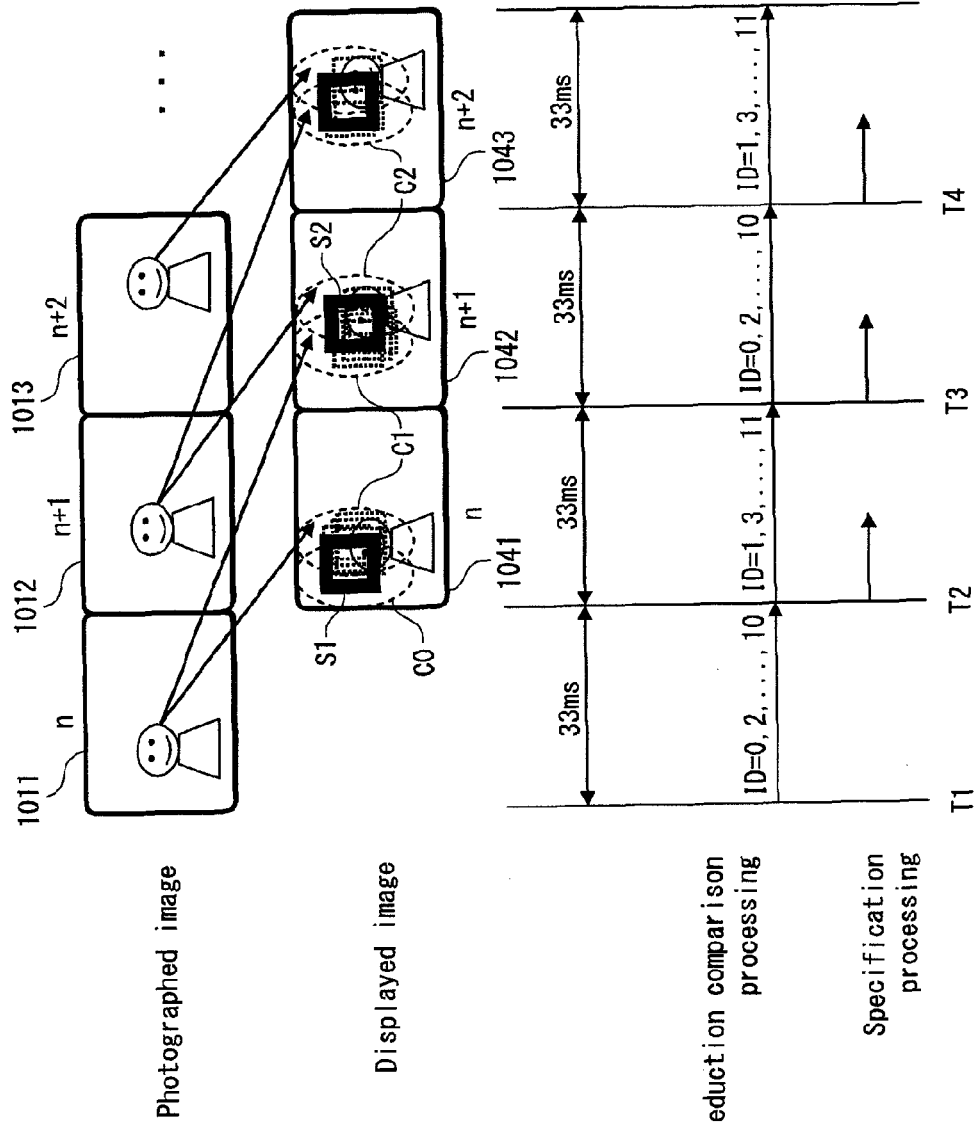
FIG. 7 illustrates how the image processing apparatus 100 specifies a facial image area over time.
Figure 8:
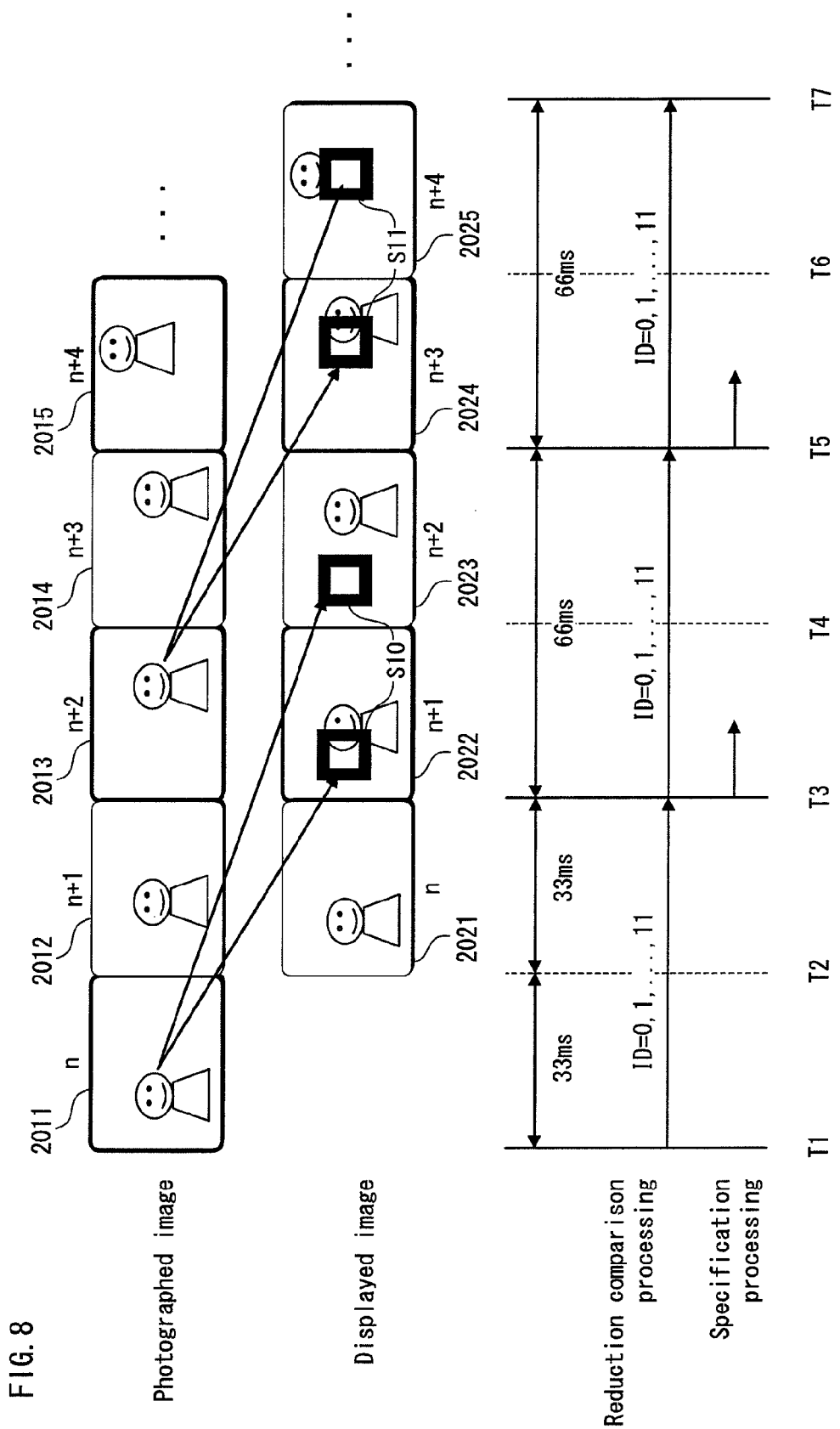
FIG. 8 illustrates how a conventional image processing apparatus specifies a facial image area over time.

The following is an explanation, with reference to FIGS. 7 and 8, of both the image processing apparatus 100 and a conventional image processing apparatus as they specify a facial image area.

<Image Processing Apparatus 100>

First, the image processing apparatus 100 is explained.

FIG. 7 illustrates how the image processing apparatus 100 specifies a facial image area over time.

This figure shows a row of photographed images 1011-1013 captured and generated by the camera 100 at 33 ms intervals.

The photographed image counter for the photographed images 1011-1013 is defined as n to n+2, with n being an even number.

The displayed images are the row of images 1041-1043 displayed by the LCD 140 at 33 ms intervals.

First, at T1, the photographed image 1011 is generated, and since in this example the photographed image counter for the photographed image 1011 is an even number, between T1 and T2, reduced images are generated using even numbered reduction IDs (0, 2 . . . 10), and comparison processing with each template is performed.

Next, at T2, when the photographed image 1012 is generated, reduced images are produced using odd numbered reduction IDs (1, 3 . . . 11) and comparison processing is performed, as with the photographed image 1011. At the same time, specification processing of the facial image area in the photographed image 1011 is performed.

This specification of the facial image area is performed based on the comparison results for the photographed image 1011 and the comparison results of the photographed image taken one image prior to the photographed image 1011. A rectangular frame S1 indicating the specified facial image area is drawn on top of the photographed image 1011 (displayed image 1041) and is displayed continually until T3.

Note that, on top of the displayed image 1041, dotted-line ellipses C0 and C1, as well as dotted-line rectangles are shown, but these shapes are only for the sake of explanation and are not actually displayed. The same holds true for displayed images 1042 and 1043.

The dotted-line rectangles indicate each detected facial image. The dotted-line ellipse C0 indicates the area that includes each facial image detected in the photographed image taken one image prior to the photographed image 1011, and the dotted-line ellipse C1 indicates the area that includes each facial image detected in the photographed image 1011.

In other words, specification of the facial image area for the photographed image 1011 is performed based on the facial images included in the ellipse C1 and the facial images included in the ellipse C0.

Next, at T3, when the photographed image 1013 is generated, using even numbered reduction IDs (0, 2 . . . 10), reduced images are produced and comparison processing is performed for this photographed image, as with the photographed image 1011 at T1. Specification processing of the facial image area is performed for the photographed image 1012 as with the photographed image 1011 at T2, and a rectangular frame S2 indicating the specified facial image area is drawn on top of the photographed image 1012 (displayed image 1042). The frame is displayed continually until T4.

Specification of the facial image area in the photographed image 1012 is performed based on each facial image (the facial images included in ellipse C2) detected in the photographed image 1012 and on each facial image (the facial images included in ellipse C1) detected in the photographed image 1011.

The photographed image 1013 is then processed in the same way.

It is therefore clear that the rectangular frames S1-S3 thus displayed on the displayed images 1041-1043 are displayed near the facial image that is actually shown.

<Conventional Image Processing Apparatus>

The following is an explanation of a conventional image processing apparatus, which generates reduced images using all 12 reduction rates and compares each reduction image with each template image.

FIG. 8 illustrates how a conventional image processing apparatus specifies a facial image area over time.

As in the explanation of FIG. 7, the photographed images 2011-2015 in this figure are captured and generated at 33 ms intervals. The photographed images 2011-2013 are exactly the same as the photographed images 1011-1013 in FIG. 7. Furthermore, the photographed image counter for the photographed images is defined as n to n+4.

The displayed images are the images 2021-2025 displayed at 33 ms intervals.

In the following explanation, the time required for the conventional image processing apparatus to complete reduction processing and comparison processing for a single photographed image is 66 ms.

First, at T1, the photographed image 2011 is generated, and by T3, reduced images are generated using all of the reduction IDs (0, 1 . . . 11) and comparison processing with each template is performed.

Next, at T2, since comparison with all of the reduced images for the photographed image 2011 has not been completed, the photographed image 2011 is displayed as is (displayed image 2021). Also, at T2, the photographed image 2012 is generated, but since comparison with all of the reduced images for the photographed image 2011 has not been completed, reduction processing and comparison processing are not performed for the photographed image 2012 at this point.

Next, at T3, based on the comparison results from T1-T3 for the photographed image 2011, specification processing of the facial image area in the photographed image 2011 is performed. A rectangular frame S10 indicating the specified facial image area is drawn on top of the photographed image 2012 (displayed image 2022) and is displayed continually until T4. Note that this conventional image processing apparatus specifies the facial image area by calculating the mean values of the coordinate values and the sizes for each detected facial image.

At T3, the photographic image 2013 is generated, and using all reduction IDs (0, 1 . . . 11), reduction processing and comparison processing for this image is performed by T5 as with the photographed image 2011 at T1.

Next, at T4, since comparison with all of the reduced images for the photographed image 2013 has not been completed, the rectangular frame S10 indicating the specified facial image area for the photographed image 2011 is drawn as is on top of the photographed image 2013 (displayed image 2023) and is displayed continually until T5.

In the same way, a rectangular frame S11 indicating the detected facial image area for the photographed image 2013 is later drawn on top of both the photographed images 2014 and 2015 (displayed images 2024, 2025). The frame is displayed from T5 to T6 for the displayed image 2024 and from T6 to T7 for the displayed image 2025.

In this way, in a conventional image processing apparatus, by generating reduced images for all of the reduction IDs and comparing them with each template image, the amount of time required for reduction processing and comparison processing ends up being longer than the time interval between photographs (in this example, 33 ms), and detection accuracy for facial images actually grows worse. In particular, displaying the rectangular frame that indicates the previous specified facial image area in displayed images 2023 and 2025 causes a great misalignment between the position of the facial image actually shown and the position of the rectangular frame.

As the image processing apparatus 100 in the embodiment of the present invention, in accordance with the processing capabilities of the apparatus, generates reduced images by alternately using reduction ratios corresponding to six even numbered reduction IDs and reduction ratios corresponding to six odd numbered reduction IDs from among the 12 reduction ratios, the apparatus is thus capable of performing reduction processing and comparison processing for each photographed image within the time interval between photographs (in this example, 33 ms), avoiding the problems of a conventional image processing apparatus.

Furthermore, since the facial image area for each photographed image is specified using the comparison results for both, the photographed image and for the photographed image taken one image prior, the effects of error can be reduced, allowing the facial image area to be specified accurately.

<<Modifications>>

The following is an explanation of a modification in which the method for selecting the reduction ratios which the image processing apparatus uses for generating reduced images is modified.

Since the image processing apparatus in the modification (hereinafter "modified image processing apparatus") is a slight modification of the above-described functions of the processor 170 in the image processing apparatus 100 and of the face detection circuit 183, only the modified elements are described below.

<Operations>

The following is an explanation of the operations of the modified image processing apparatus.

Figure 9:
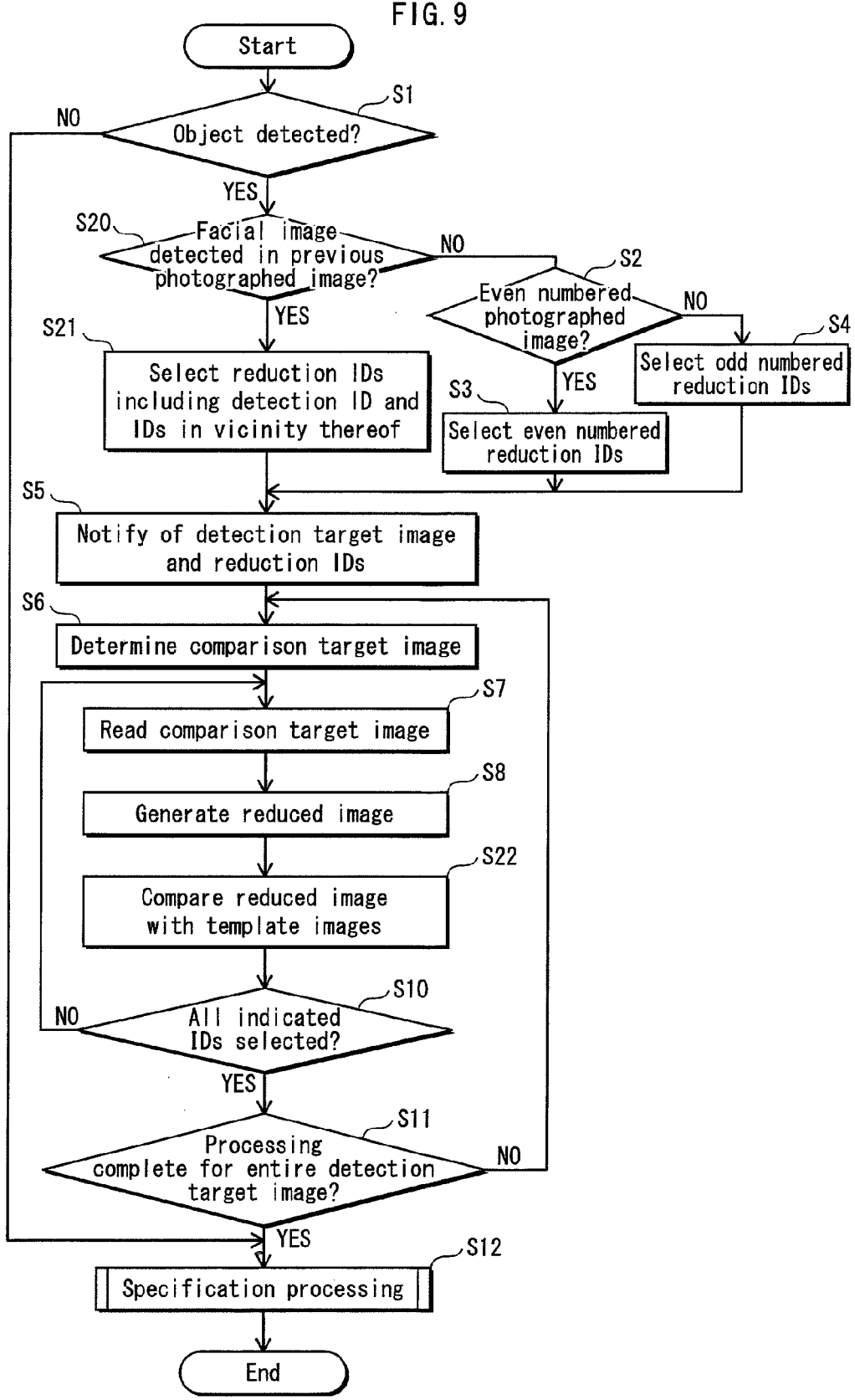
FIG. 9 is a flowchart showing the operations of the image processing apparatus in the modification.

FIG. 9 is a flowchart showing the operations of the modified image processing apparatus.

As shown in the figure, the modified image processing apparatus differs from the image processing apparatus 100 in that it includes the processing in step S22 instead of the processing in step S9 in FIG. 5.

The processing in step S22 differs from the processing in step S9 in that, in step S22, the face detection circuit in the modification not only records the comparison results in the result list generated in the result memory 181, but also transmits these comparison results to the processor in the modification.

Furthermore, the modified image processing apparatus differs from the image processing apparatus 100 by including, in addition to each processing step shown in FIG. 5, processing steps S20 and S21.

If information indicating that an object was detected is included in the detection results input from the object detection circuit 160 (step S1: YES), then the processor in the modification determines whether or not a facial image was detected in the photographed image taken one image prior to the photographed image currently being processed, in accordance with the comparison results transmitted, in the above-described step S22, by the face detection circuit in the modification (step S20). In other words, a positive determination is only made when information indicating that a facial image was detected is included in these comparison results. Note that when information indicating that a facial image was not detected is included in the detection results input from the object detection circuit 160 for the photographed image taken one image prior, then a negative determination is made.

When a facial image has not been detected in the photographed image taken one image prior (step S20: NO), then the processing in step S2 is performed, and in accordance with the processing results, the reduction IDs are selected in either step S3 or step S4.

When a facial image has been detected in the photographed image taken one image prior (step S20: YES), then six or fewer reduction IDs are selected from among (i) the reduction IDs included in the comparison results that include information indicating that a facial image was detected and (ii) reduction IDs in the vicinity of the reduction IDs in (i) (step S21).

For example, if the reduction ID included in the comparison results which include information indicating that a facial image was detected is "2," then the reduction IDs in the vicinity are "1" and "3." Therefore, in this example the reduction IDs "1"-"3" are selected.

When the number of reduction IDs selected is fewer than six, additional reduction IDs may be selected at will in order to bring the number of reduction IDs up to six.

The reduction IDs selected in steps S21, S3, or S4, as well as the coordinate values for the detection target image included in the input detection results are notified to the face detection apparatus in the modification (step S5). Subsequent processing is the same as the processing explained in FIG. 5.

<Supplementary Remarks>

This concludes the explanation of the image processing apparatus in the present invention based on an embodiment and a modification thereof. The following modifications, however, are also possible, and of course the present invention is not limited to an image processing apparatus exactly as shown in the embodiment or the modification described above.

(1) The structural elements described in the embodiment and the modification may be partially or completely realized as a computer program, or as an integrated circuit composed of one chip or a plurality of chips.

Figure 10:
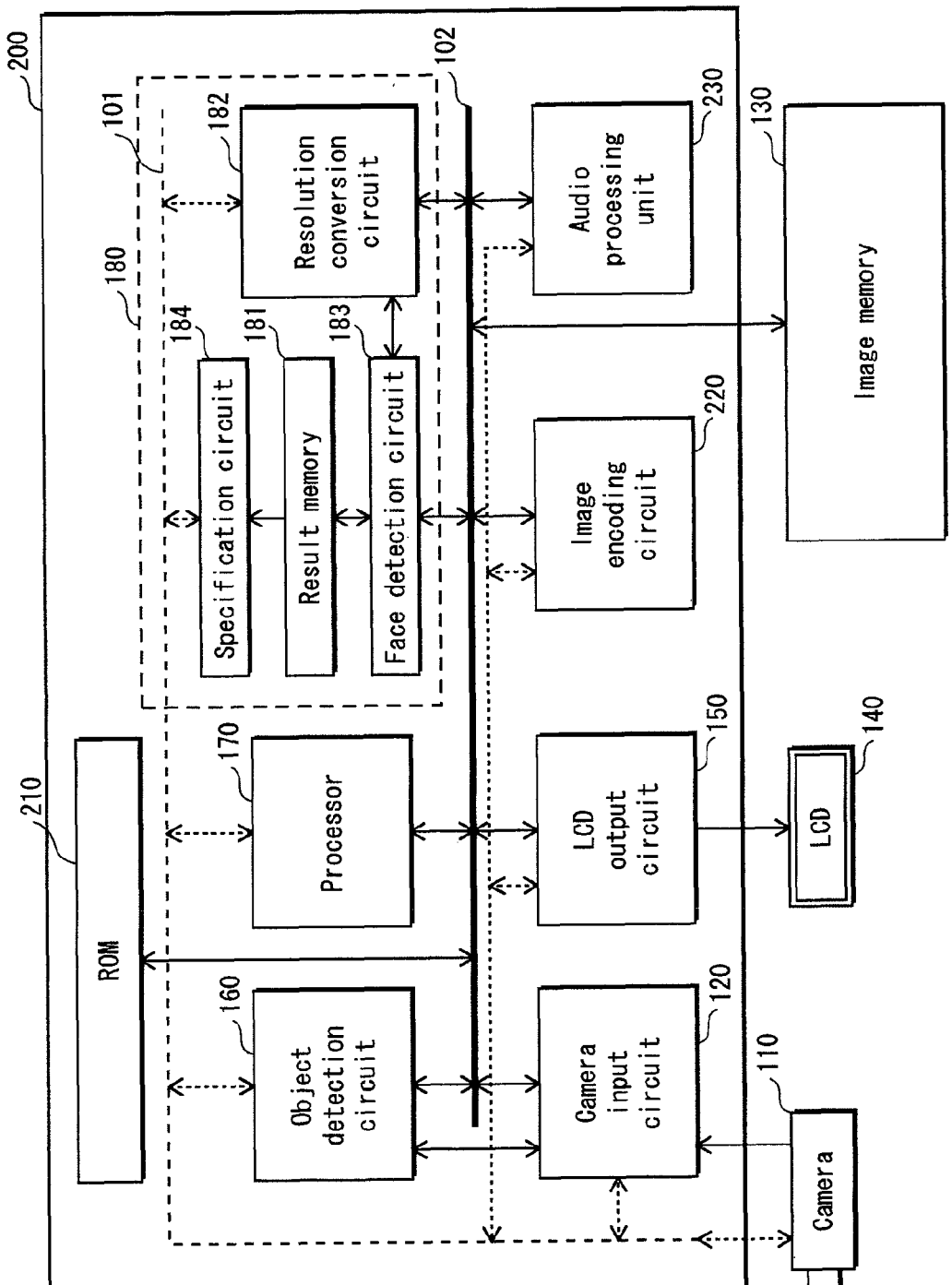
FIG. 10 shows an example of the structure of a semiconductor integrated circuit 200 that includes the face detection apparatus 180 described in the embodiment.

FIG. 10 shows an example of the structure of a semiconductor integrated circuit 200 that includes the face detection apparatus 180 described in the embodiment.

As shown in FIG. 10, the semiconductor integrated circuit 200 includes a semiconductor integrated circuit corresponding to the face detection apparatus 180, and depending on the use of the apparatus to which the semiconductor integrated circuit 200 is applied; may also include a ROM 210, an image encoding circuit 220, an audio processing unit 230, etc.

The semiconductor integrated circuit 200 is generally structured as an MOS transistor such as a CMOS, and a specified logic circuit is realized by a structure of connections with the MOS transistor. In recent years, the integration degree of semiconductor integrated circuits has progressed, and since an extremely complicated logic circuit can be realized by one or more semiconductor integrated circuits, the face detection apparatus 180 can be made compact, and low energy consumption can be achieved.

Note that the semiconductor integrated circuit 200 has been described as including a semiconductor integrated circuit corresponding to the face detection apparatus 180 in the embodiment. However, the semiconductor integrated circuit 200 may alternatively include a semiconductor integrated circuit corresponding to the face detection apparatus in the modification.

(2) Although in the embodiment and the modification, explanation was not provided in particular for the case when a plurality of facial images were included in a photographed image, i.e. when a plurality of detection target images was detected. Processing may be performed, however, to detect facial images in each of a plurality of detection target images.

(3) In the embodiment and the modification, the size of the photographed image was described as 4VGA, the size of the comparison target image as QVGA, and the size of the template image as 24×24 pixels. The present invention is not limited to these sizes, however, and sizes may be selected arbitrarily.

(4) The template images for the embodiment and the modification were described as being of three types, but the number of template images is not limited to three. For example, only a template image that faces forward may be used, or template images for a larger number of facial angles than three may be used for comparison.

(5) The face detection apparatus in the embodiment and the modification was described as comparing a reduced image with each of a plurality of template images, but the template images used for comparison may be narrowed down based on the comparison results in the result list, stored in the result memory 181, for the photographed image taken one image prior.

In other words, the one or more template images indicated by the one or more template IDs included in the comparison results that include information indicating that a facial image was detected for the photographed image one image prior may be used for comparison.

(6) In the embodiment and the modification, comparison is described as being performed in all comparison target areas in the detection target area regardless of whether a facial image has been detected. However, when according to a predetermined condition (for example, that a degree of coincidence with the template image is greater than or equal to a predetermined threshold) a determination is made that a facial image has been detected, the detection processing for that photographed image may be ended.

(7) Although in the embodiment and the modification, the facial image detector is described as detecting a facial image, it may also detect a specified image other than a face. The specified image may also be, for example, an identification tag attached to a person or object, and in this case, the specified image may be used to identify an individual or a type of object based on the detected identification tag.

(8) In the embodiment and modification, the object detection circuit 160 is described as detecting an object by comparing edge detection results of a photographed image in which an object is not shown and a photographed image stored in the image memory 130. This is only an example, however, and detection may be performed by another method such as by finding the difference between pixel values of successively generated photographed images.

(9) In the embodiment and the modification, the reduction ratio is described as changing by $(1/1.22)^n$ each time as shown in FIG. 3. This is only one example, however, and the reduction ratios may be set to change by another amount, for example $(1/1.25)^2$, as long as the size of the image that has been reduced by the smallest reduction ratio (that is, the image having the greatest degree of reduction) is larger than size of the template image.

(10) In the embodiment and the modification, an example of the image processing apparatus was described in which the apparatus generated reduces images for a selected comparison target image by successively changing the reduction ID, as shown in steps S6-S8 of FIGS. 5 and 9. Reduced images may be generated, however, for one reduction ID while successively changing the position of the comparison target image.

(11) In the embodiment and the modification, as shown in step S7 of FIGS. 5 and 9, the resolution conversion circuit 182 was described as reading the comparison target image from the image memory 130 every time reduced images are generated, yet this circuit may store a generated reduced image and use this stored image to generate reduced images at other reduction ratios. For example, if the resolution conversion circuit 182 was notified by the processor 170 of even numbered reduction IDs, it may read the comparison target image once from the image memory 130, generate a reduced image at the reduction ratio corresponding to the reduction ID 0, and generate the following reduced images corresponding to reduction IDs 2, 4 . . . 10 by multiplying the generated reduction image by $(1/1.22)^2$.

(12) In the embodiment and modification, the operations of the image processing apparatus as shown in steps S2-S4 in FIGS. 5 and 9 were described as follows: when the photographed image counter for the photographed image subject to detection is an even number (step S2: YES), the apparatus selects even numbered reduction IDs (step S3), and when the photographed image counter for the photographed image is an odd number (step S2: NO), the apparatus selects odd numbered reduction IDs (step S4). However, such selection can be reversed. In other words, steps S3 and S4 can be switched.

(13) The object detection circuit 160 and the processor in the embodiment and the modification have been described as not being included in the face detection apparatus. The object detection circuit 160 and the processor may, however, be included in whole or in part in the face detection apparatus.

(14) In the embodiment and the modification, the selection processing for a comparison target image shown in FIGS. 5 and 9 (step S6) was described as being performed by the resolution conversion circuit 182, but this processing may be performed by the processor, having the processor then notify the resolution conversion circuit 182 of the coordinate values of the selected comparison target image.

(15) The processor in the embodiment and the modification was described as making the object detection circuit 160 perform detection processing for all of the photographed images. After the object detection circuit 160 performs detection processing once, however, it can be made not to perform detection processing for a predetermined number of photographed images, performing processing once again for the next photographed image after the predetermined number of images has been taken.

In this case, for each photographed image taken while the object detection circuit 160 is not performing detection processing, the processor notifies the face detection apparatus of the coordinate values for the detection target image included in the preceding detection results received from the object detection circuit 160.

Furthermore, during this time, the processor may be made not to notify the face detection apparatus of the coordinate values for the detection target image, and the face detection apparatus may store the coordinate values for the detection target image of which it was notified once by the processor until it is notified again by the processor of new coordinate values for the detection target image, selecting a comparison target image within the comparison target images indicated by the stored coordinate values.

When it has detected a facial image, the face detection circuit may store the coordinate values of the comparison target images as converted into coordinates in the photographed image, and while the processor is not providing notification of the coordinate values of the detection target image, processing of the photographed image currently being processed may only be performed for the comparison target images indicated by the stored coordinate values.

(16) The processor in the embodiment and the modification was described as making the object detection circuit 160 perform detection processing on all of the photographed images, but after detection has been performed once, the object detection circuit 160 may be made not to perform detection processing until it is notified by the face detection apparatus that a facial image area could not be specified. In the meantime, the same variation as described above in (15) can be used as the selection method for each comparison target image for comparison processing.

(17) In the embodiment and the modification, the specification circuit 184 was described as transmitting the coordinate values for the upper left edge of the specified facial image area as well as the size of the image area to the processor, but if the facial image area can be determined, other information may be transmitted. For example, the coordinate values for the lower right edge could be transmitted, as could the coordinate values for both the upper left edge and the lower right edge.

Furthermore, the processor was described as notifying the face detection apparatus of the coordinate values for the upper left edge and lower right edge of the detection target image, but if the detection target image can be specified, then similarly other information can be notified, such as the coordinate values for the upper left edge or the lower right edge along with the size of the image.

The same is also true for the coordinate values included in the detection results transmitted to the processor by the object detection circuit 160, i.e. the coordinate values for the upper left edge and lower right edge of the detection target image.

(18) In the discussion of the embodiment, reduction processing and comparison processing were described as being performed for the photographed image 1011 between T1 and T2, with specification processing of the facial image area for the photographed image 1011 starting at T2, as shown in FIG. 7. When the image processing apparatus 100 has processing capabilities to spare, however, the apparatus may be made to perform reduction processing, comparison processing, and specification processing for one photographed image within the time interval between photographs (in the above-described example, 33 ms).

Reduction processing, comparison processing, and specification processing can also be performed within the time interval between photographs by decreasing the number of reduced images that the image processing apparatus 100 generates. Since reducing the number of reduced images that are generated generally leads to less accuracy during detection of facial images, even when the image processing apparatus is modified so that the number of reduced images that are generated is decreased, it is assumed that accuracy will be within the range permitted by the image processing apparatus.

These changes can also be applied to the modified image processing apparatus.

(19) The image processing apparatus in the embodiment and the modification were described as generating reduced images for each photographed image using six or fewer reduction IDs from among 12 reduction IDs. However, the user may be allowed to select between a mode that uses all 12 reduction IDs and a mode that uses six or fewer reduction IDs, with the apparatus generating a number of reduced images corresponding to the selected mode.

It is assumed that the image processing apparatus in the embodiment and the modification does not have the processing capability to generate all 12 reduced images within a predetermined time interval (in this example, 33 ms). For subjects that are almost at rest, however, the problem of a specified image area and the actual area in the subject becoming greatly out of alignment will not occur, even if a specified image is detected after the predetermined time interval has passed. Therefore, the user can make the apparatus specify a facial image area more accurately by, for example, selecting the mode that uses all 12 reduction IDs when photographing a person who is still.

(20) The specification circuit 184 in the embodiment and the modification was described as specifying a facial image area in a current photographed image in accordance with the comparison results included in two result lists: the result list for the current photographed image, and the result list for the photographed image taken one image prior. The specification circuit 184 can be made to specify a facial image area in a current photographed image, however, in accordance with comparison results included in three or more result lists. For example, specification can further use the comparison results for a photographed image taken two images prior to the current image. In this case, the result memory 181 would also need to store the result list for the photographed image taken two images prior.

In the embodiment and the modification, the photographic image input prior to the current photographic image was described as being the photographic image taken one image prior, but the current invention is not limited in this way. A photographic image taken two images prior may, for example, be used. In other words, the apparatus may be modified so that it specifies facial image areas included in the current photographic image in accordance with comparison results included in two result lists: the result list for the current photographed image, and the result list for the photographed image taken two images prior.

(21) The processor in the embodiment and the modification was described as selecting, for each photographed image, the reduction IDs for generating reduced images from among the 12 reduction IDs. The reduction IDs to choose from, however, are in no way limited to 12 different types. That is, more or less than 12 types may be used.

Also, the processor in the embodiment was described as selecting six reduction IDs, but of course the number of reduction IDs selected is not limited to six. As long as the number of reduction IDs selected is equal to or less than the number of reduced images the image processing apparatus is capable of generating within the predetermined time interval, the number of selected reduction IDs may be any number. The number of selected reduction IDs may also be changed for each photographed image.

(22) The processor in the modification was described, as shown in FIG. 9, as alternatively selecting even numbered reduction IDs and odd numbered reduction IDs for each photographed image in accordance with the photographed image counter (steps S2-S4) when no facial image was detected in the photographed image taken one image prior to the current photographed image (step S20: NO). The processor may be made, however, to choose six or fewer reduction IDs arbitrarily.

(23) The processor in the modification was described, as shown in step S21 in FIG. 9, as selecting (i) the reduction IDs for which a facial image was detected in the photographed image taken one image prior and (ii) the reduction IDs in the vicinity of the reduction IDs in (i). The processor may select, however, only the reduction IDs for which a facial image was detected, or only the reduction IDs in the vicinity thereof. In this case, when the number of reduction IDs is fewer than six, in order to bring the number of selected reduction IDs up to six, reduction IDs may be selected arbitrarily or selected sequentially from 0 to 11. The same kind of selection can also be made when the number of reduction IDs selected in step S21 in the modification is fewer than six.

(24) In the embodiment and the modification, reduced images for each photographed image were described as being generated using six or fewer reduction IDs (referred to in (24) as "selected IDs") from among 12 reduction IDs (referred to in (24) as "candidate IDs"), but the modifications described below are also possible.

(a) When the number of candidate IDs L is an even number and the number of selected IDs M (M<L) is larger than L/2, then for photographed images, (i) L/2 even numbered reduction IDs and M−L/2 odd numbered reduction IDs and (ii) L/2 odd numbered reduction IDs and M−L/2 even numbered reduction IDs can be selected alternately.

For example, if L is 12 and M7, then for photographed images, (i) six even numbered reduction IDs and one odd numbered reduction ID and (ii) six odd numbered reduction IDs and one even numbered reduction ID are selected alternately.

Furthermore, the number of even numbered reduction IDs and of odd numbered reduction IDs selected for photographed images can be adjusted arbitrarily as long as the number of reduction IDs selected for a photographed image is equal to or less than M. For example, the proportion of even numbered reduction IDs and of odd numbered reduction IDs selected for each photographed image can be changed. In this case, the even numbered reduction IDs and odd numbered reduction IDs that are selected may be selected arbitrarily from among all of the even numbered reduction IDs and odd numbered reduction IDs, or they may be selected sequentially.

(b) When the number of candidate IDs L is an odd number and the number of selected IDs M (M<L) is larger than L/2, then for photographed images, (i) (L+1)/2 even numbered reduction IDs and M−(L+1)/2 odd numbered reduction IDs and (ii) (L−1)/2 odd numbered reduction IDs and M−(L−1)/2 even numbered reduction IDs can be selected alternately.

In this case, the M−(L+1)/2 odd numbered reduction IDs may be selected arbitrarily from among all of the odd numbered reduction IDs or may be selected sequentially. The same is also true for the M−(L−1)/2 even numbered reduction IDs.

For example, if L is 11 and M is 6, then for photographed images, (i) six even numbered reduction IDs and (ii) five odd numbered reduction IDs and one even numbered reduction ID are selected alternately.

Furthermore, the number of even numbered reduction IDs and of odd numbered reduction IDs selected for photographed images can be adjusted arbitrarily as long as the number of reduction IDs selected for a photographed image is equal to or less than M as described above in (a).

(c) When the number of selected IDs M (M>L) is smaller than L/2, L being the number of candidate IDs, then for photographed images, (i) M or fewer even numbered reduction IDs and (ii) M or fewer odd numbered reduction IDs can be selected alternately. The M or fewer even numbered reduction IDs and the M or fewer odd numbered reduction IDs may be selected arbitrarily from among all of the even numbered reduction IDs and all of the odd numbered reduction IDs respectively, or they may be selected sequentially.

For example, if L is 12 and M is 5, then for photographed images, (i) five or fewer arbitrary even numbered reduction IDs and (ii) five or fewer arbitrary odd numbered reduction IDs are selected alternately.

Furthermore, the number of even numbered reduction IDs and of odd numbered reduction IDs selected for photographed images can be adjusted arbitrarily as long as the number of reduction IDs selected for a photographed image is equal to or less than M as described above in (a).

(25) The reduced image generation unit in the image processing apparatus in the present invention corresponds to the resolution conversion circuit 182 in the embodiment and the modification, the comparison unit corresponds to the face detection circuit, the specification unit corresponds to the specification circuit 184, the control unit corresponds to the processor, and the display unit corresponds to the processor, LCD output circuit 150, and LCD 140.

INDUSTRIAL APPLICABILITY

The image processing apparatus in the present invention can be used for detection of facial images by digital cameras or the like.

REFERENCE SIGNS LIST

100 Image processing apparatus
101 Processor bus
102 Memory bus
110 Camera
120 Camera input circuit
130 Image memory
140 LCD
150 LCD output circuit
160 Object detection circuit
170 Processor
180 Face detection apparatus
181 Result memory
182 Resolution conversion circuit
183 Face detection circuit
184 Specification circuit
200 Semiconductor integrated circuit

The invention claimed is:

1. An image processing apparatus for specifying, in photographed images taken at a predetermined time interval and input sequentially, an image area as a target of predetermined processing, the image processing apparatus comprising:
   a reduced image generation unit that (i) has processing capability to generate reduced images, in accordance with a particular input photographed image, at K (K≧1) ratios within the predetermined time interval and (ii) is operable to generate reduced images at ratios indicated from among L (L>K) different ratios;
   a comparison unit operable to compare each reduced image generated by the reduced image generation unit with template images and to transmit comparison results;
   a specification unit operable to perform specification of the image area in accordance with the comparison results transmitted by the comparison unit; and
   a control unit that, for each photographed image that is input, is operable to (i) select M (M≦K) or fewer ratios for each photographed image in accordance with ratios indicated for a photographed image input prior to each photographed image, (ii) indicate the selected M or fewer ratios to the reduced image generation unit and make the reduced image generation unit generate each reduced image, (iii) make the comparison unit compare each generated reduced image, and (iv) make the specification unit specify the image area for each photographed image in accordance with, at least, comparison results transmitted by the comparison unit.

2. The image processing apparatus in claim 1, wherein
   the control unit alternately indicates to the reduced image generation unit, as the M or fewer ratios for each photographed image that is input, (i) M or fewer ratios that include N (N≦M) ratios selected from among odd numbered ratios and (ii) M or fewer ratios that include N (N≦M) ratios selected from among even numbered ratios, the even and odd numbered ratios corresponding to the L ratios arranged in ascending or descending order.

3. The image processing apparatus in claim 2, wherein
   the control unit (i) selects one or more ratios from among M or fewer ratios indicated for a photographed image input prior to a particular photographed image, in accordance with comparison results transmitted from the comparison unit for the photographed image input prior to the particular photographed image, the comparison results indicating that an image corresponding to a template image was detected, and (ii) includes the selected ratios in the M or fewer ratios for the particular photographed image which are indicated to the reduced image generation unit.

4. The image processing apparatus in claim 2, wherein
   the control unit (i) selects one or more ratios from among M or fewer ratios indicated for a photographed image input prior to a particular photographed image, in accordance with comparison results transmitted from the comparison unit for the photographed image input prior to the particular photographed image, the comparison results indicating that an image corresponding to a template image was detected, and (ii) includes, in the N ratios for the particular photographed image, ratios that are immediately before or after the selected ratios in the ascending or descending order of the L ratios.

5. The image processing apparatus in claim 2, wherein
   the comparison unit transmits, as the comparison results, pieces of area information each indicating an image area that is detected through comparison of each reduced image with template images, the image area corresponding to one of the template images, and the specification unit performs the specification in accordance with (i) the pieces of area information for a particular photographed image and (ii) the pieces of area information for a photographed image input prior to the particular photographed image, the pieces of area information in (i) and (ii) being transmitted by the comparison unit.

6. The image processing apparatus in claim 5, wherein the specification unit specifies one image area, in accordance with pieces of area information that indicate image areas that are positioned within a predetermined proximity to each other, from among (i) the pieces of area information for the particular photographed image and (ii) the pieces of area information for the photographed image input prior to the particular photographed image, the pieces of area information in (i) and (ii) being transmitted by the comparison unit.

7. The image processing apparatus in claim 1, wherein the control unit determines the M or fewer ratios for a particular photographed image to indicate to the reduced image generation unit in accordance with comparison results, transmitted by the comparison unit, for a photographed image input prior to the particular photographed image.

8. The image processing apparatus in claim 1, wherein a plurality of candidate template images is stored as candidates for the template images, and the comparison unit selects the template images to use for comparison of a particular photographed image from among the candidate template images, in accordance with comparison results for a photographed image input prior to the particular photographed image.

9. The image processing apparatus in claim 1, wherein the comparison unit transmits, as the comparison results, pieces of area information each indicating an image area that is detected through comparison of each reduced image with template images, the image area corresponding to one of the template images, and the specification unit performs the specification in accordance with (i) the pieces of area information for a particular photographed image and (ii) the pieces of area information for a photographed image input prior to the particular photographed image, the pieces of area information in (i) and (ii) being transmitted by the comparison unit.

10. The image processing apparatus in claim 9, wherein the specification unit specifies one image area, in accordance with pieces of area information that indicate image areas that are positioned within a predetermined proximity to each other, from among (i) the pieces of area information for the particular photographed image and (ii) the pieces of area information for the photographed image input prior to the particular photographed image, the pieces of area information in (i) and (ii) being transmitted by the comparison unit.

11. The image processing apparatus in claim 1, further comprising a display unit that, for each photographed image that is input, is operable to display both (i) the photographed image and (ii) a frame indicating an image area at a position on the photographed image corresponding to the image area as specified for the photographed image by the specification unit.

12. An image processing method in an image processing apparatus for specifying, in photographed images taken at a predetermined time interval and input sequentially, an image area as the target of predetermined processing, the image processing method comprising the steps of:

a reduced image generation step that (i) has processing capability to generate reduced images, in accordance with a particular input photographed image, at K ($K \geqq 1$) ratios within the predetermined time interval and (ii) generates reduced images at ratios indicated from among L (L>K) different ratios;

a comparison step to compare each reduced image generated in the reduced image generation step with template images and transmit comparison results;

a specification step to specify the image area in accordance with the comparison results transmitted in the comparison step; and for each photographed image that is input, a control step to (i) select M ($M \leqq K$) or fewer ratios for each photographed image in accordance with ratios indicated for a photographed image input prior to each photographed image, (ii) indicate the selected M or fewer ratios to the reduced image generation step and make the reduced image generation step generate each reduced image, (iii) make the comparison step compare each generated reduced image, and (iv) make the specification step specify the image area for each photographed image in accordance with, at least, comparison results transmitted in the comparison step.

13. An integrated circuit used in image processing for specifying, in photographed images taken at a predetermined time interval and input sequentially, an image area as the target of predetermined processing, the integrated circuit comprising:

a reduced image generation unit that (i) has processing capability to generate reduced images, in accordance with a particular input photographed image, at K ($K \geqq 1$) ratios within the predetermined time interval and (ii) is operable to generate reduced images at ratios indicated from among L (L>K) different ratios;

a comparison unit operable to compare each reduced image generated by the reduced image generation unit with template images and to transmit comparison results;

a specification unit operable to perform specification of the image area in accordance with the comparison results transmitted by the comparison unit; and a control unit that, for each photographed image that is input, is operable to (i) select M ($M \leqq K$) or fewer ratios for each photographed image in accordance with ratios indicated for a photographed image input prior to each photographed image, (ii) indicate the selected M or fewer ratios to the reduced image generation unit and make the reduced image generation unit generate each reduced image, (iii) make the comparison unit compare each generated reduced image, and (iv) make the specification unit specify the image area for each photographed image in accordance with, at least, comparison results transmitted by the comparison unit.

* * * * *